United States Patent Office 3,522,596
Patented Aug. 4, 1970

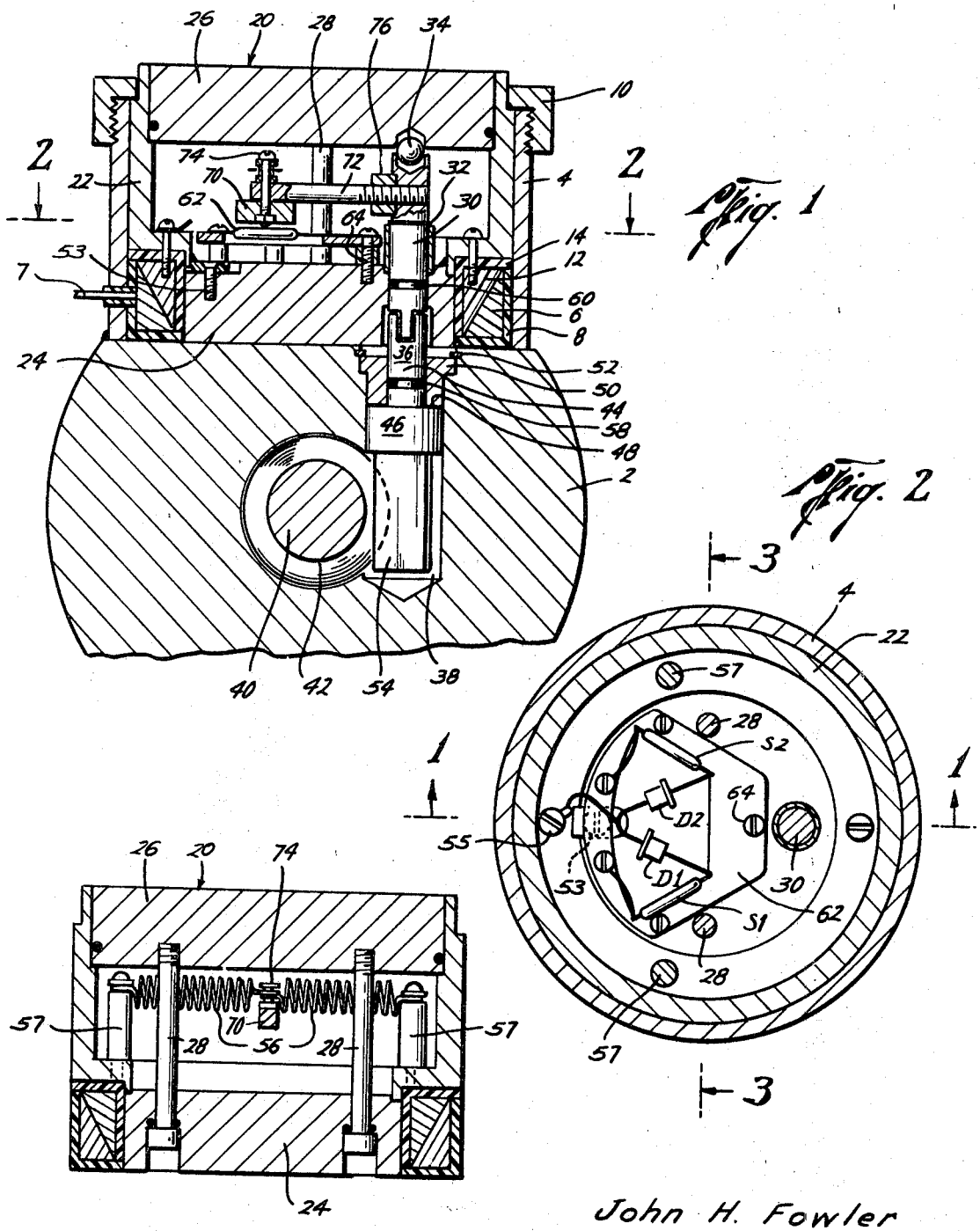

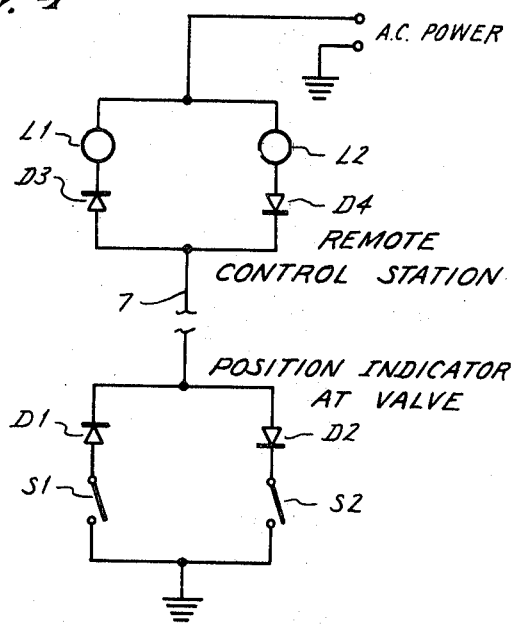
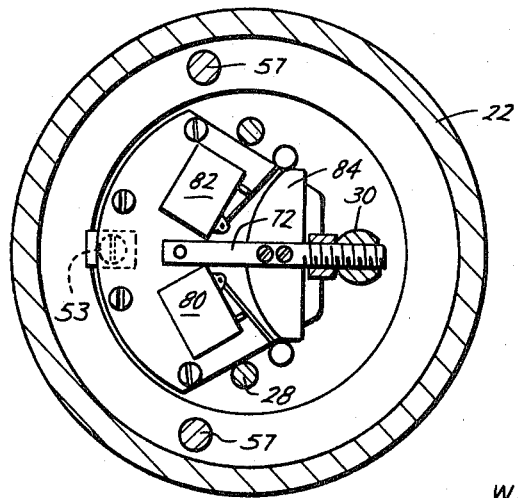
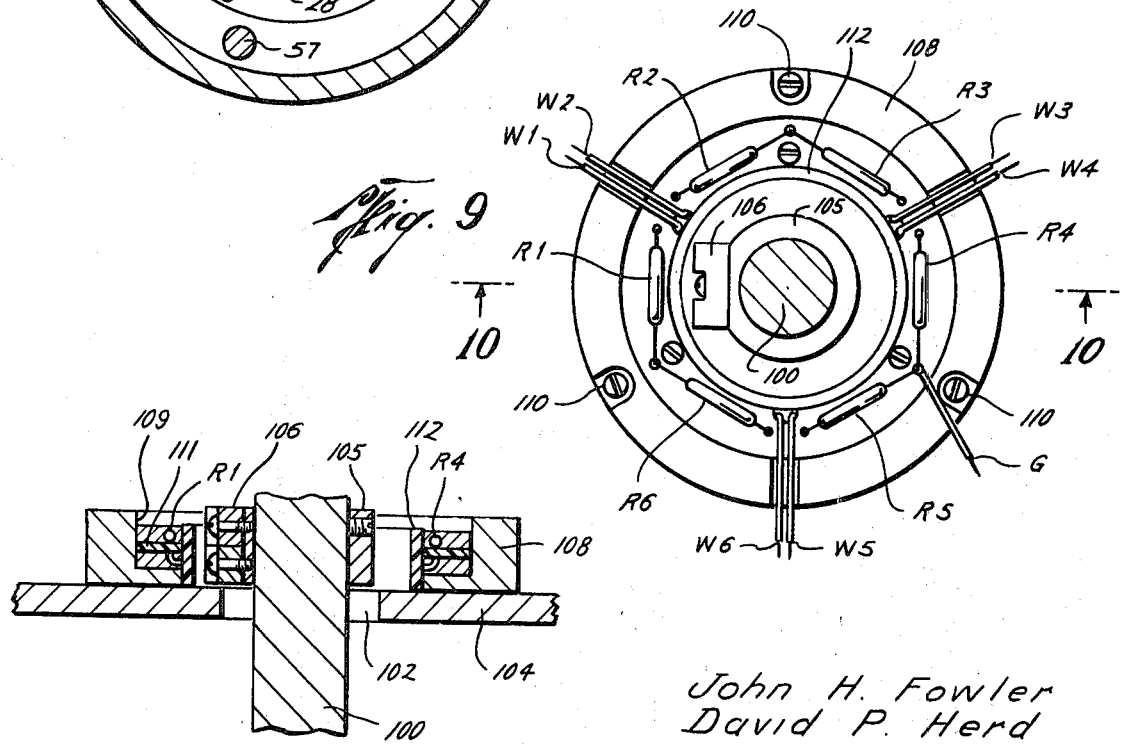

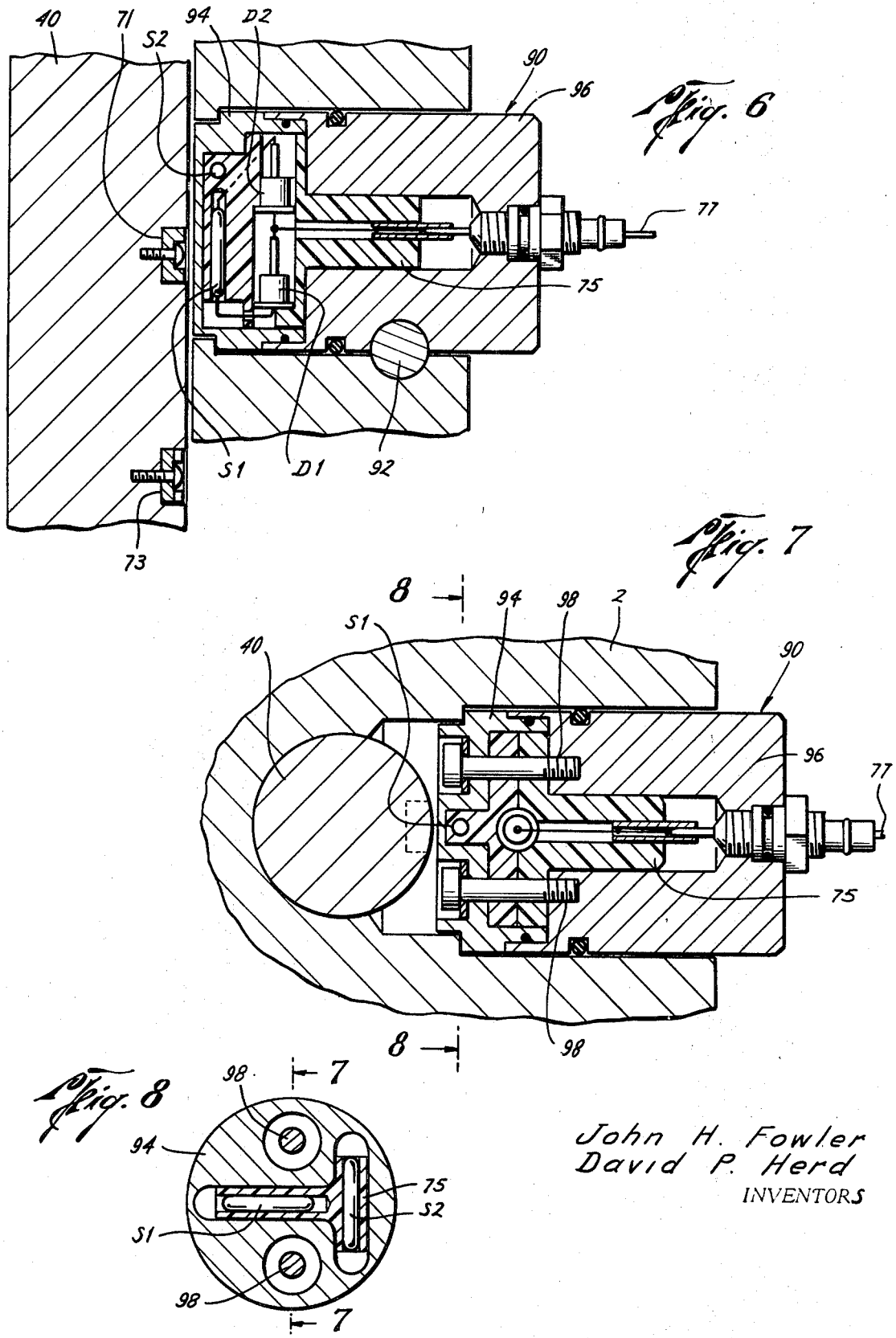

3,522,596
POSITION TRANSMITTER
John H. Fowler and David P. Herd, Houston, Tex., assignors to Rockwell Manufacturing Company, Houston, Tex., a corporation of Pennsylvania
Filed Oct. 19, 1966, Ser. No. 587,841
Int. Cl. G08b 21/00
U.S. Cl. 340—238                                           10 Claims

ABSTRACT OF THE DISCLOSURE

A remote position indicator for indicating the position of a movable device comprising an electrical circuit which may contain one or more reed contact devices which are closed by magnetic forces from one or more permanent magnets. The magnets may be mounted for movement, with movable component, into proximity with the reed contact devices. One embodiment of the invention comprising diode circuits may be used to indicate at least two positions without requiring more than one electrical conductor from transmitting means at the movable component to remote indicating means.

---

This invention relates to remote position indicators and more particularly to valve and rotating equipment position indicators. More specifically, the invention pertains to devices for indicating open and closed positions of valves and rotational attitude of rotating apparatus such as shafts.

Frequently it is necessary to locate equipment, such as valves, in remote locations not visible to the eye. For example, valves are sometimes installed in oil and gas well Christmas trees at the ocean floor. These valves may be opened and closed remotely by hydraulic operators. It is necessary to positively know whether the valves are open or closed for normal operational purposes and also to detect any abnormal conditions which may arise. Also, it may be desirable to transmit the location of a rotating shaft, as for example, a shaft attached to a pilot unit for sequence operation of valve controls.

The present invention is a position indicator comprising an electrical circuit which is activated by movement of the valve or rotating shaft. The electrical circuit contains one or more reed switches which are closed by magnetic forces from a permanent magnet which is moved into proximity with the switches by means attached to the valve or rotating equipment as the case may be. One embodiment of the invention indicates two positions of a valve without requiring more than one electrical wire from the valve location to the remote control station.

It is, therefore, a primary object of the invention to provide a remote position indicator for transmitting the position of a valve.

Another object of the invention is to provide an electro-mechanical valve position indicator which requires only one electric wire to transmit open and closed position.

Still another object of the invention is to provide a remote position indicator for relaying the rotational attitude of a rotating element.

Other objects will become apparent from the following description and drawings wherein:

FIG. 1 is a top view in section of one embodiment of the invention attached to the bonnet of a valve taken along line 1—1 of FIG. 2;

FIG. 2 is a front view of the embodiment of FIG. 1 taken along line 2—2 of FIG. 1;

FIG. 3 is an elevation in section of the embodiment of FIGS. 1 and 2 taken along line 3—3 of FIG. 2;

FIG. 4 is a schematic diagram of the electrical circuitry of one embodiment of the inventiin;

FIG. 5 is a front sectional view of a modification of the embodiment of FIGS. 1, 2 and 3;

FIG. 6 is an elevation in section of another embodiment of the invention showing a position indicator installed in a valve bonnet;

FIG. 7 is a plan view of the embodiment of FIG. 6 taken along line 7—7 of FIG. 8;

FIG. 8 is a cross-sectional view of the embodiment of FIG. 7 taken along line line 8—8 of FIG. 7;

FIG. 9 is a plan view of still another embodiment of the invention for indication of rotational attitude; and FIG. 10 is an elevation in section of the embodiment of FIG. 9 taken along line 10—10 of FIG. 9.

Referring first to FIG. 1, a cross-sectional top view, a position transmitter 20 is shown mounted on a valve bonnet 2 within a socket formed by a cylindrical housing 4 welded to the side of bonnet 2. At the base of the socket a conductive electrical contact ring 6 and insulating ring 8 are affixed. Contact ring 6 is connected to a single conductor 7 which passes through the wall of the housing 4 and is run to a remote control location. A power source and indicating lamps are connected to the conductor at the remote control location. Position transmitter 20 is held in position by coupling 10.

Position transmitter 20 includes a sleeve portion 22, circular lower plate 24 and circular upper plate 26 and is held together by cap screws 28. Attached to the base of lower plate 24 is a conductive contact ring 12 and insultion ring 14. Cooperating electrical rings 6 and 12 allow position transmitter 20 to be removed or installed without disturbing any electrical or pressure connections. Position transmitter 20 may be easily installed or removed by a diver underwater.

Mounted in bottom plate 24 is switch actuator shaft 30. Shaft 30 is prevented from axial movement by snap ring 32 and ball bearing 34 mounted in recessed holes of upper plate 26 and the upper end of shaft 30. The lower end of shaft 30 is machined flat to form a key to cooperate with a keyway formed in the end of paddle shaft 36.

Paddle shaft 36 is mounted in a hole 38 in bonnet 2. The axis of hole 38 is perpendicular to the axis of the stem 40 of the valve of which bonnet 2 is a part. The axis of hole 38 is offset from stem 40 so that the cylindrical surface of hole 38 is approximately tangent to a reduced diameter portion 42 of stem 40. Paddle shaft 36 has a smaller diameter 44 in which the keyway previously mentioned is machined. A larger diameter 46 provides a shoulder 48. Retainer ring 50 and snap ring 52 hold paddle shaft 36 in position. A portion of larger diameter 46 is machined flat to provide paddle 54 which is normally biased by springs 56 (see FIG. 3) within position indicator 20, so that the flat faces of paddle 54 face upwardly and downwardly. Paddle shaft 36 and actuator shaft 30 are sealed by O-rings 58 and 60 respectively.

Stem 40 has a larger diameter (not shown) above and below smaller diameter 42, providing shoulders to contact paddle 54 on upward and downward movement of stem 40. This will be explained later.

Within position transmitter 20 a terminal board 62 is attached to lower plate 24 by screws 64. Terminal board 62 provides mounting support for electrical circuitry which can be better understood with reference to FIGS. 2 and 4. Within position indicator 20, reed switches S1 and S2 are connected to diodes D1 and D2. Reed switches S1 and S2 are commercially available. Basically, they are two leaf spring contact members enclosed within a glass housing. The contact members overlap and are normally separated. If a magnet is passed over the switch so that one magnet pole is over one contact member and the other magnet pole is over the other contact member, the magnetic forces cause one contact member to be of north polarity and the other to be of south polarity. Thus, the contact members are drawn together, contacting each other and closing the switch. Switch S1 and diode D1 are connected in parallel with switch and diode D2. One end of this parallel circuit is connected to ground and the other is connected to a terminal 55, which is conductive and carries signals to the contact ring 12. This ring contacts the conductive ring 6, so that signals may be carried by conductor 7 to another parallel circuit at the control station. The control station circuit contains another diode D3 and a lamp L1 in parallel with diode D4 and lamp L2. This circuit is connected by a single conductor to an alternating current power source which is also connected to ground. As is generally known, diodes pass only the positive or negative part of an alternating current cycle. Thus, if diodes D1 and D3 oriented to pass the positive cycle portion and D2 and D4 are oriented to pass the negative cycle portion, only one interconnecting conductor is required. If switch S1 is closed, lamp L1 will be energized, and if switch S2 is closed, lamp L2 will so indicate.

Referring again to FIG. 1, to actuate the reed switches S1 and S2, a small permanent magnet 70 is provided. It is attached to a cantilever arm 72 by screw 74. Cantilever arm 72 is attached to actuator shaft by screw threads and a nut 76. The poles of magnet 70 are oriented so as to actuate reed switches S1 and S2 when adjacent to them. Thus, if shaft 30 is rotated properly, arm 72 causes magnet 70 to swing into position over either switch S1 or S2 to close that switch. Springs 56 connected to arm 72 and extending to posts 57 on each side bias the arm 72 to a neutral position.

The operation of the position transmitter will now be described. As the stem 40 of the valve moves downwardly to close the valve the shoulder connecting smaller diameter 42 with the upper larger diameter contacts paddle 54 causing paddle shaft 36 to rotate. Paddle shaft 36, through shaft 30, causes arm 72 and magnet 70 to swing downward. The smaller diameter of stem 40 is of such a length that, on complete closing of the valve, arm 72 moves magnet 70 directly over switch S2 to close it, and a signal passes through diodes D2 and D4 to lamp L2 to remotely indicate the closure of the valve. If the valve is opened, stem 40 moves upwardly, the shoulder connecting smaller diameter 42 and the lower larger diameter contacts paddle 54, rotating paddle shaft 36 is the opposite direction, causing magnet 70 to be positioned directly above swtch S1. A signal then passes through diodes D1 and D3 to lamp L1 indicating the full opening of the valve. As can be understood, between full open and full closed, magnet 70 is biased to a neutral position by springs 56. Therefore, if neither lamp L1 or L2 is lit, it will be known that the valve is neither fully closed or open.

Another embodiment of the invention is shown in FIG. 5. In this embodiment, micro-switches 80 and 82 are substituted for reed switches S1 and S2. To actuate micro-switches 80 and 82 a cam 84 is attached to arm 72. On full closure cam 84 closes micro-switch 82 and on full opening it closes micro-switch 80.

Still another embodiment of the invention is shown in FIGS. 6, 7 and 8. A generally cylindrical position transmitter 90 is inserted in a hole drilled from the outer surface of bonnet 2 communicating with stem 40 and perpendicular thereto. Indicator 90 is held in position by a shoulder screw 92 passing through bonnet 2 resting in a groove on the lower circumference of transmitter 90.

Transmitter 90 includes two cylindrical housing portions 94 and 96 telescopically joined by cap screws 98. Enclosed within these housing portions is electrical circuitry similar to that described in FIG. 4. The significant difference in this embodiment and those previously described is that it requires no rotating shafts to actuate reed switches S1 and S2. Instead, the arrangement of switches S1 and S2, and two magnets 71 and 73, attached to stem 40, provide a unique switching operation. Switch S1 is installed vertically and switch S2 is installed horizontally, both being fitted into suitable cavities formed in a suitable plastic filler 75 carried within the housing portions 94 and 96. Filler 75 is also provided with cavities to receive diodes D1 and D2, which are connected to the switch as shown in FIG. 4, and which are also connected to a conductor 77 to conduct signals to the indicator.

Magnet 71 has its poles in vertical alignment and magnet 73 has its poles in horizontal alignment. Magnet 71 is so located on stem 40 that when the valve is closed the magnet is adjacent switch S1, causing the switch to close and indicating at the control location that the valve is closed. Magnet 73 is so located that when the valve is closed. Magnet 73 is so located that when the valve is opened the magnet is adjacent switch S2 causing that switch to close and indicating at the control location that the valve is opened. Since reed switches S1 and S2 are perpendicular to each other and the poles of magnets 71 and 73 lie on perpendicular lines, one magnet will actuate only one switch.

As can be seen from the foregoing discussion, remote indication of open and closed positions of a valve is effectively attained. Only one electrical conductor is required to transmit both positions. All embodiments described are easily connected.

As previously discussed, the rotational attitude of remote equipment is sometimes desired. The principles of the present invention may be used to provide rotational indication. Referring to FIGS. 9 and 10 such apparatus will be described. A rotatable shaft 100 is shown extended through a hole in a stationary plate 104. Attached to shaft 100 by means of a collar 105 is a permanent magnet 106 having its poles on a line perpendicular to shaft 100. Surrounding shaft 100 is a mounting ring 108 attached to plate 104 by screws 110. Mounting ring 108 is counterbored at 109, and a tubular member 112 forms an inner wall for the counterbore. The tubular member is made of a non-magnetic, non-conducting material. Within the counterbore 109 there is positioned an annular insulating plate 111, on which are positioned, at 60 degree intervals, reed switches R1, R2, R3, R4, R5 and R6, in a plane perpendicular to the axis of shaft 100. One end of each reed switch is connected to ground G. The other end of each is connected to separate lead wire W1, W2, W3, W4, W5 and W6. The counterbore is then filled with a potting material, such as silicone rubber. Each lead wire is run to lamps and a power source at a remote control location.

As shaft 100, which may be attached to any type of rotational equipment, rotates, magnet 106 is positioned adjacent one of the reed switches. This causes that particular switch to close, indicating by a lamp at the remote control location the rotational attitude of shaft 100 and the apparatus to which it is attached. Although the particular embodiment described indicates six positions, any number of positions may be indicated by changing the number of switches. The embodiment shown requires six lead wires to the remote control location. This number may be cut in half by use of diodes as in FIG. 4.

Although several embodiments of the invention have been described, many more modifications thereof may be made by one skilled in the art without departing from the spirit of the invention and it is intended that the invention be limited only by the scope of the following claims.

We claim:

1. Apparatus for indicating the position of a valve comprising: transmitter means installed at said valve indicator means installed at a remote location and connected to said transmitter means by electrical conductor means; and a power source connected to said indicator means, said transmitter means comprising a plurality of magnetic reed contact devices stationarily mounted and a plurality of magnets attached to the stem of said valve for movement relative to said reed contact devices, a first of said magnets being movable to a position adjacent a first of said reed contact devices to actuate said first reed contact device without actuating a second of said reed contact devices to transmit a first particular position of said valve to said indicator means, a second of said magnets being movable to a position adjacent said second reed contact device to actuate said second reed contact device without actuating said first reed contact device to transmit a second particular position of said valve to said indicator means.

2. Apparatus according to claim 1, wherein the axes of said first and second reed contact devices are mounted perpendicular to each other and the pole alignment of said first magnet and said second magnet are perpendicular to each other, the pole alignment of said first and second magnets being parallel with the axes of said first and second reed contact devices, respectively.

3. Apparatus according to claim 1, wherein all of said transmitter means except said magnets is enclosed in a protective non-conductive housing all of said transmitter and said housing being removable from said valve without disturbing any electrical connections.

4. Apparatus according to claim 1, wherein said first and second reed contact devices are mounted immediately adjacent one another.

5. Apparatus according to claim 1, wherein said electrical conductor means is a single electrical conductor and wherein said transmitter means comprises electrical circuitry producing one type of signal on actuation of said first reed contact device and another type of signal on actuation of said second reed contact device.

6. Apparatus for indicating the position of a movable device comprising: transmitter means installed at said movable device; indicator means installed at a remote location connected to said transmitter means and a power source connected to said indicator means, said transmitter means comprising at least two magnetic reed contact devices stationarily mounted immediately adjacent one another, the axis of each reed contact device being perpendicular to the adjacent reed contact device, and at least two magnets attached to said movable device for movement relative to said reed contact devices, the pole alignment of a first magnet being perpendicular to the pole alignment of a second magnet, and the pole alignment of said first and second magnets being mutually parallel at all times to the axis of a first and second reed contact device, respectively, said first magnet being movable to a position adjacent said first reed contact device to actuate said first reed contact device without actuating said second reed contact device to transmit a first particular position of said movable device to said indicator means, said second magnet being movable to a position adjacent said second reed contact device to actuate said second reed contact device without actuating said first reed contact device to transmit a second particular position of said movable device to said indicator means.

7. Apparatus according to claim 6, wherein said power source is an alternating current source and a first diode is connected in series with said first reed contact device, a second diode being connected in series with said second reed contact device, said first diode and contact device being connected in parallel with said second diode and contact device.

8. Apparatus according to claim 7, wherein said indicator means comprises a first indicator and a second indicator, said first indicator being operable on actuation of said first reed contact device and said second indicator being operable on actuation of said second reed contact device.

9. Apparatus according to claim 8 wherein said first indicator and a third diode are connected in parallel with said second indicator and a fourth diode, said alternating current power source being connected to said indicator means by a single conductor, said indicator means also being connected to said transmitter means by a single conductor.

10. Apparatus according to claim 7, wherein said first diode passes current only during the positive position of said alternating current cycle and said second diode passes current only during the negative portion of said alternating current cycle.

References Cited

UNITED STATES PATENTS

| | | | |
|---|---|---|---|
| 564,168 | 7/1896 | Tower | 340—271 |
| 1,762,066 | 6/1930 | Mackey | 200—61.86 |
| 1,994,336 | 3/1935 | Dawson | 116—125 |
| 2,014,388 | 9/1935 | Lamb | 200—56 |
| 2,826,165 | 3/1958 | Adelson | 116—124 |
| 2,907,991 | 10/1959 | Van Allen | 340—282 |
| 2,966,133 | 12/1960 | Hube | 340—239 |
| 3,032,754 | 5/1962 | Pietro | 340—282 |
| 3,084,264 | 4/1963 | Kosonocky | 307—317 |
| 3,243,664 | 3/1966 | Louis | 307—317 |
| 3,332,438 | 7/1967 | Abdullaev | 200—61.86 |
| 3,375,812 | 4/1968 | Keiji Koda | 335—151 |
| 3,155,955 | 11/1964 | Davidson et al. | 340—332 |
| 3,189,763 | 6/1965 | Chown | 340—277 |
| 3,217,307 | 11/1965 | Fogelquist | 340—282 |

FOREIGN PATENTS 997,298  7/1945  France.

JOHN W. CALDWELL, Primary Examiner

D. MYER, Assistant Examiner

U.S. Cl. X.R.

340—188, 205, 271